（12） United States Patent
Luan et al.

(10) Patent No.: US 12,190,283 B2
(45) Date of Patent: Jan. 7, 2025

(54) DELIVERY METHOD, SERVER, AND TERMINAL (71) Applicant: Huawei Technologies Co., Ltd., Shenzhen (CN)

(72) Inventors: Jiangyi Luan, Shenzhen (CN); Zijun Li, Shenzhen (CN); Ning Piao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 167 days.

(21) Appl. No.: 16/883,584

(22) Filed: May 26, 2020

(65) Prior Publication Data

US 2020/0356949 A1 Nov. 12, 2020

Related U.S. Application Data

(63) Continuation of application No. 14/583,948, filed on Dec. 29, 2014, now Pat. No. 10,692,040, which is a (Continued)

(30) Foreign Application Priority Data

Jul. 5, 2012 (CN) .......................... 201210231190.9

(51) Int. Cl.
*G06Q 10/08* (2024.01)
*G06Q 10/0833* (2023.01)
*G06Q 10/0835* (2023.01)

(52) U.S. Cl.
CPC ....... *G06Q 10/08355* (2013.01); *G06Q 10/08* (2013.01); *G06Q 10/0833* (2013.01)

(58) Field of Classification Search
CPC .............. G06Q 10/08; G06Q 10/0833; G06Q 10/08355; G06Q 50/28
See application file for complete search history.

(56) References Cited

U.S. PATENT DOCUMENTS 6,618,593 B1 9/2003 Drutman et al.
6,980,131 B1 12/2005 Taylor
(Continued)

FOREIGN PATENT DOCUMENTS

CN 102521720 A 6/2012
CN 102521755 A 6/2012
(Continued)

OTHER PUBLICATIONS

Steinfield, Charles. "Does online and offline channel integration work in practice." Workshop on e-commerce impacts revisited, DIW-Berlin. 2004. (Year: 2004).*
(Continued)

*Primary Examiner* — Scott M Tungate
(74) *Attorney, Agent, or Firm* — Conley Rose, P.C.

(57) ABSTRACT

An information processing method includes receiving a query request sent by a logistics terminal; determining, in at least one prestored order, target order information that corresponds to an authentication identifier and includes a delivery address within a delivery distance threshold range that uses a current location of the logistics terminal as a center; feeding back the determined target order information to the logistics terminal; and pushing online prompt information to a corresponding ordering user terminal according to the ordering user account in the target order after an arrival notice instruction sent by the logistics terminal is received.

18 Claims, 5 Drawing Sheets

Related U.S. Application Data continuation of application No. PCT/CN2013/078795, filed on Jul. 4, 2013.

(56) References Cited

U.S. PATENT DOCUMENTS

| | | | |
|---|---|---|---|
| 7,835,951 B1* | 11/2010 | Burger | G06Q 30/0601 |
| | | | 705/28 |
| 8,015,023 B1* | 9/2011 | Lee | G06Q 10/08 |
| | | | 700/226 |
| 2003/0146854 A1 | 8/2003 | Jones | |
| 2006/0010037 A1* | 1/2006 | Angert | G06Q 30/0601 |
| | | | 705/15 |
| 2007/0192111 A1* | 8/2007 | Chasen | G06Q 10/08 |
| | | | 705/338 |
| 2009/0216600 A1* | 8/2009 | Hill | G06Q 30/02 |
| | | | 705/7.14 |
| 2010/0041418 A1 | 2/2010 | Edge et al. | |
| 2010/0131769 A1 | 5/2010 | Homma | |
| 2011/0148634 A1* | 6/2011 | Putz | G08B 21/22 |
| | | | 340/541 |
| 2011/0179064 A1 | 7/2011 | Russo | |
| 2011/0238755 A1* | 9/2011 | Khan | G06Q 50/01 |
| | | | 709/204 |
| 2012/0030133 A1* | 2/2012 | Rademaker | G06Q 10/08 |
| | | | 705/333 |
| 2013/0086615 A1* | 4/2013 | Williams | H04N 21/4788 |
| | | | 725/62 |
| 2013/0173424 A1 | 7/2013 | Kwon | |

FOREIGN PATENT DOCUMENTS

| | | |
|---|---|---|
| CN | 102542429 A | 7/2012 |
| CN | 102542495 A | 7/2012 |
| CN | 102779300 A | 11/2012 |
| EP | 2189930 A | 5/2010 |
| JP | H09035192 A | 2/1997 |
| JP | 2004091150 A | 3/2004 |
| JP | 2004231402 A | 8/2004 |
| JP | 20050112571 A | 4/2005 |
| JP | 2009020608 A | 1/2009 |
| JP | 2010128535 A | 6/2010 |
| JP | 2012500589 A | 1/2012 |
| KR | 20070000258 A | 1/2007 |
| KR | 20070006645 A | 1/2007 |
| KR | 200800071222 A | 8/2008 |
| KR | 20110003735 A | 1/2011 |
| WO | 0165455 A2 | 9/2001 |

OTHER PUBLICATIONS

Ichoua, et al., "Vehicle dispatching with time-dependent travel times," European Journal of Operational Research 144.2, 2003, pp. 379-396.

* cited by examiner

DELIVERY METHOD, SERVER, AND TERMINAL

CROSS-REFERENCE TO RELATED APPLICATIONS

This application is a continuation of U.S. patent application Ser. No. 14/583,948 filed on Dec. 29, 2014, which is a continuation of International Patent Application No. PCT/CN2013/078795 filed on Jul. 4, 2013, which claims priority to Chinese Patent Application No. 201210231190.9 filed on Jul. 5, 2012. All of the aforementioned applications are hereby incorporated by reference in their entireties.

TECHNICAL FIELD

The present disclosure relates to the field of information processing technologies, and in particular, to an information processing method, a server, and a logistics terminal.

BACKGROUND

With the continuous development of electronic commerce (e-commerce), more and more people get used to online shopping, and with enhanced performance of mobile phones, wireless e-commerce also begins to flourish. Mainstream e-commerce websites provide user clients for mobile phone users, and a user can shop online by using a user client.

In other approaches, during goods delivery, a logistics person needs to communicate with a user by phone, so as to instruct the user to pick up goods at a corresponding delivery place. However, during massive delivery, when arriving at a logistics distribution place, the logistics person needs to instruct each ordering user by phone to pick up goods at a corresponding delivery place, which results in low delivery efficiency and a high cost.

Therefore, how to improve goods delivery efficiency and reduce a delivery cost during goods delivery is a problem to be solved by the present disclosure.

SUMMARY

To solve the technical problem described above, embodiments of the present disclosure provide an information processing method, a server, and a logistics terminal, so as to improve goods delivery efficiency and reduce a delivery cost. Technical solutions are as follows.

According to one aspect, an embodiment of the present disclosure provides an information processing method, including receiving a query request sent by a logistics terminal, where the query request carries current location information, a delivery distance threshold, and an authentication identifier that correspond to the logistics terminal; determining, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; feeding back the determined target order information to the logistics terminal; and pushing online prompt information to a corresponding ordering user terminal according to the ordering user account in the target order after an arrival notice instruction sent by the logistics terminal is received, where the online prompt information includes the current location information of the logistics terminal and logistics delivery information.

Correspondingly, an embodiment of the present disclosure provides a server, including a receiving module configured to receive a query request sent by a logistics terminal, where the query request carries current location information, a delivery distance threshold, and an authentication identifier that correspond to the logistics terminal; a target order determining module configured to determine, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; a target order feedback module configured to feed back the determined target order information to the logistics terminal; and an online information pushing module configured to push online prompt information to a corresponding ordering user terminal according to the ordering user account in the target order after an arrival notice instruction sent by the logistics terminal is received, where the online prompt information includes the current location information of the logistics terminal and logistics delivery information.

According to another aspect, an embodiment of the present disclosure further provides an information processing method, which may include obtaining current location information of a logistics terminal; encapsulating the current location information, an authentication identifier, and a delivery distance threshold into a query request, and sending the query request to a server; receiving target order information that is within a delivery distance threshold of a current location, where the target order information is fed back by the server and includes an ordering user account and a delivery address; and sending an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

Correspondingly, an embodiment of the present disclosure further provides a logistics terminal, including a current location obtaining module configured to obtain current location information of the logistics terminal; a query request processing module configured to encapsulate the current location information, an authentication identifier, and a delivery distance threshold into a query request, and send the query request to a server; a target order receiving module configured to receive target order information that is within a delivery distance threshold of a current location, where the target order information is fed back by the server and includes an ordering user account and a delivery address; and an arrival notice sending module configured to send an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

In the technical solutions provided in the embodiments of the present disclosure, during goods delivery, after receiving a query request sent by a logistics terminal and determining at least one target order that meets the query request, a server feeds back target order information to the logistics terminal;

and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To effectively improve goods delivery efficiency and reduce a delivery cost during goods delivery, embodiments of the present disclosure provide an information n processing method, a server, and a logistics terminal.

The following first describes an information processing method provided in an embodiment of the present disclosure.

It should be noted that, an application precondition of the processing method provided in the present disclosure is that, after logging in a client of an e-commerce system by using an ordering user account, an ordering user may choose a fixed address or a location corresponding to an ordering user terminal as a delivery address when placing an order for determined goods; when the ordering user chooses the location corresponding to the ordering user terminal as the delivery address, the ordering user terminal obtains, by using a positioning apparatus, information about a location where the ordering user terminal is located, and then, sends the location information together with information about goods purchased by the ordering user, an ordering user name, remark information, the ordering user account, a communication identifier, and the like, as an order to a server; then, the server obtains the order corresponding to the ordering user account, and processes the order, for example: assigning a logistics company, assigning a logistics person, and generating a logistics document.

It can be understood that, in an actual application, the location corresponding to the ordering user terminal may be obtained by using the Global Positioning System (GPS), or obtained by using a base station positioning apparatus, which are both proper. Certainly, the positioning apparatus described in the embodiment of the present disclosure is merely used as an example, which should not limit this solution.

The following describes the information processing method provided in the embodiment of the present disclosure from the perspective of how a logistics terminal interacts with a server during goods delivery.

It can be understood that, the logistics terminal and a subsequent user terminal each may be a mobile phone, a notebook, a tablet computer, or the like.

Figure 1:
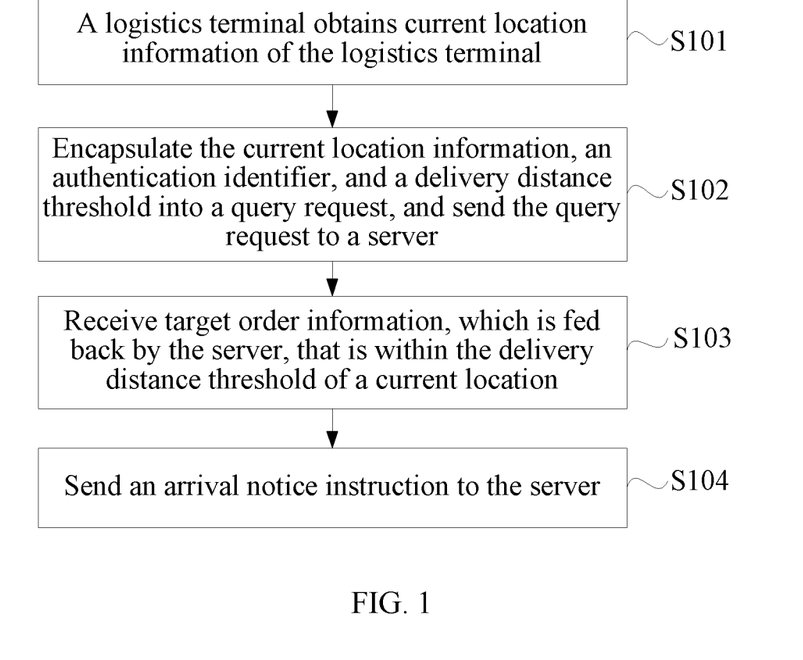
FIG. 1 is a first flowchart of an information processing method according to an embodiment of the present disclosure.

From the perspective of a logistics terminal, as shown in FIG. 1, an information processing method may include the following steps.

S101. The logistics terminal obtains current location information of the logistics terminal.

S102. Encapsulate the current location information, an authentication identifier, and a delivery distance threshold into a query request, and send the query request to a server.

During goods delivery, after a logistics delivery person arrives at a delivery place, when needing to query target order information which the logistics delivery person is responsible for and is within a range of a designated area of the delivery place, the logistics delivery person may log in a client of an e-commerce system by using a logistics user account of the logistics delivery person to send a query request triggering command to the server. In this case, the logistics terminal obtains the current location information of the logistics terminal, and then, encapsulates the current location information, the authentication identifier, and the delivery distance threshold into the query request, and sends the query request to the server.

The logistics terminal may obtain current location information corresponding to the logistics delivery person by using a built-in GPS module, a base station positioning apparatus, or the like; and the delivery distance threshold may be designated by the logistics terminal, and used to designate a delivery range, for example, within 500 meters from a current location.

It should be noted that, the authentication identifier is an identifier allocated by the server to the logistics terminal or the logistics delivery person, and is uniquely corresponding to the logistics terminal or the logistics delivery person. After receiving the query request sent by the logistics terminal, the server may authenticate the logistics terminal by using the authentication identifier in the query request. After the authentication succeeds, the server queries, according to the current location information of the logistics terminal and the delivery distance threshold, target order information that meets the query request, and after determining the target order information, returns, to the logistics terminal, the target order information that is within the delivery distance threshold of a current location of the logistics terminal.

S103. Receive information, which is fed back by the server, about a target order that is within the delivery distance threshold of a current location.

The target order information includes an ordering user account and a delivery address; and certainly, may further include information such as goods information, and a communication identifier corresponding to an ordering user terminal.

S104. Send an arrival notice instruction to the server.

The arrival notice instruction is used to instruct the server to push online prompt information to a corresponding ordering user terminal according to the ordering user account in the target order, where the online prompt information includes the current location information of the logistics terminal and logistics delivery information; and the logistics delivery information may include a name of goods purchased by the ordering user, and a current logistics status, for example, information indicating that goods are already delivered to the current location of the logistics terminal.

After receiving the target order fed back by the server, the logistics terminal may send the arrival notice instruction to the server, to instruct the server to push, by using the ordering user account, the current location information of the logistics terminal and the logistics delivery information to an ordering user terminal in the target order, so that the ordering user knows a status of ordered goods in time and picks up the goods in time.

Further, the logistics terminal analyzes the received target order, and displays, according to the order information, a delivery address corresponding to the ordering user and a current location corresponding to the logistics terminal to the logistics delivery person in a direct manner of using a map, so that the logistics delivery person knows the ordering user within the delivery distance threshold of the current location more directly.

Figure 2:
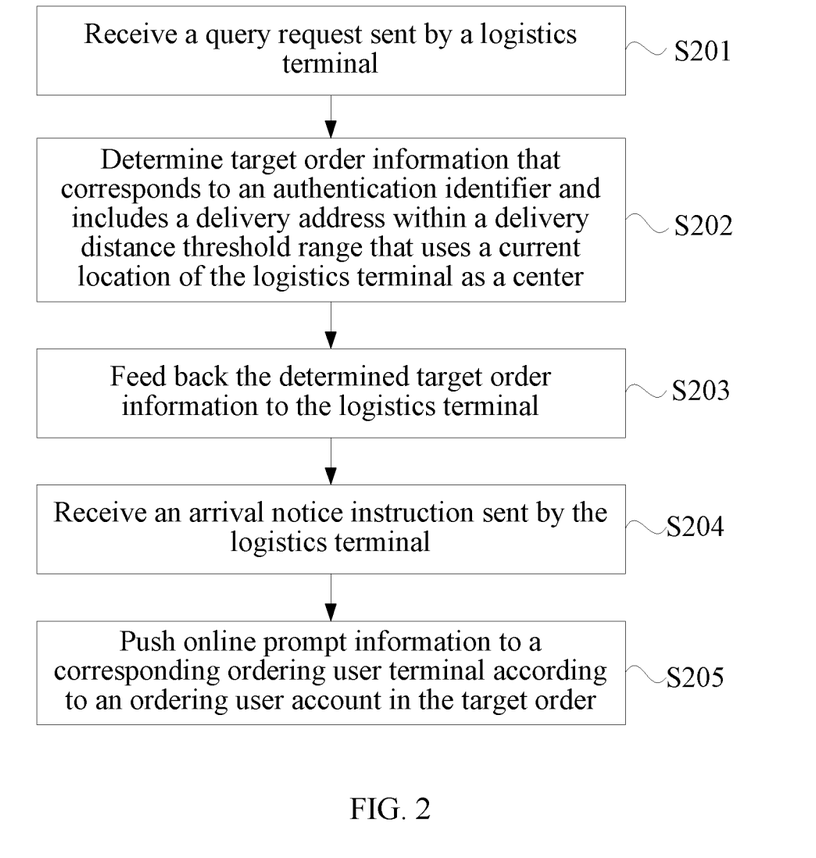
FIG. 2 is a second flowchart of an information processing method according to an embodiment of the present disclosure.

From the perspective of a server, as shown in FIG. 2, an information processing method may include the following steps.

S201. Receive a query request sent by a logistics terminal.

The query request carries current location information, a delivery distance threshold, and an authentication identifier that correspond to the logistics terminal.

S202. Determine, in at least one prestored order, target order information that corresponds to the authentication identifier and includes a delivery address within a delivery distance threshold range that uses a current location of the logistics terminal as a center.

The order includes a corresponding ordering user account and delivery address when an ordering user places the order; and certainly, may further include information such as goods information, and a communication identifier corresponding to an ordering user terminal.

After receiving the query request sent by a logistics delivery person by using the logistics terminal, the server needs to authenticate the logistics terminal by using the authentication identifier in the query request. After the authentication succeeds, the server screens the at least one order stored in the server to determine a target order that meets the query request.

It can be understood that, the server stores at least one order delivered by an ordering user by using the ordering user terminal, where the order includes a corresponding ordering user account and delivery address when the ordering user places the order, and certainly, further includes information such as goods information, and a communication identifier corresponding to the ordering user terminal. The delivery address in the order may be a fixed address, or a location corresponding to the ordering user terminal when the order is placed; when the ordering user has a specific shipping address, the ordering user may choose a fixed address as the delivery address; when the ordering user cannot specify a current address or shipping address, the ordering user may choose the location corresponding to the ordering user terminal as the delivery address when placing the order, and pick up the goods by using the location corresponding to the ordering user terminal.

S203. Feed back the determined target order information to the logistics terminal.

After the target order information corresponding to the query request sent by the logistics terminal is determined, the determined target order information may be sent to the logistics terminal; and the logistics terminal receives the target order information, and performs corresponding processing according to the target order information.

S204. Receive an arrival notice instruction sent by the logistics terminal.

S205. Push online prompt information to a corresponding ordering user terminal according to the ordering user account in the target order.

The online prompt information includes the current location information of the logistics terminal and logistics delivery information.

After receiving the target order fed back by the server, the logistics terminal may send the arrival notice instruction to the server, so as to instruct the server to push the current location information of the logistics terminal and the logistics delivery information to the corresponding ordering user terminal by using the ordering user account in the target order, so that the ordering user knows a status of ordered goods in time and picks up the goods in time. The server may push the online prompt information to the ordering user terminal in a form of a text message according to the ordering user account in the target order, and certainly, the form is not limited to the form of the text message.

In the technical solution provided in the embodiment of the present disclosure, during goods delivery, after receiving a query request sent by a logistics terminal and determining at least one target order that meets the query request, a server feeds back target order information to the logistics terminal; and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

When placing an order, the ordering user may use a location corresponding to the ordering user terminal as the delivery address because the shipping address is uncertain or the ordering user is unfamiliar with a local area; or, although the ordering user chooses the fixed address as the delivery address when placing the order, a location of the ordering user is uncertain, and in this case, during goods delivery, the delivery address of the ordering user may not match a current location of the ordering user. Therefore, to ensure goods delivery efficiency and reduce a cost, the logistics person needs to identify an ordering user whose delivery address and current location are not matched, so as to separately notify the unmatched ordering user. Therefore, the embodiment of the present disclosure further provides an information processing method.

Figure 3:
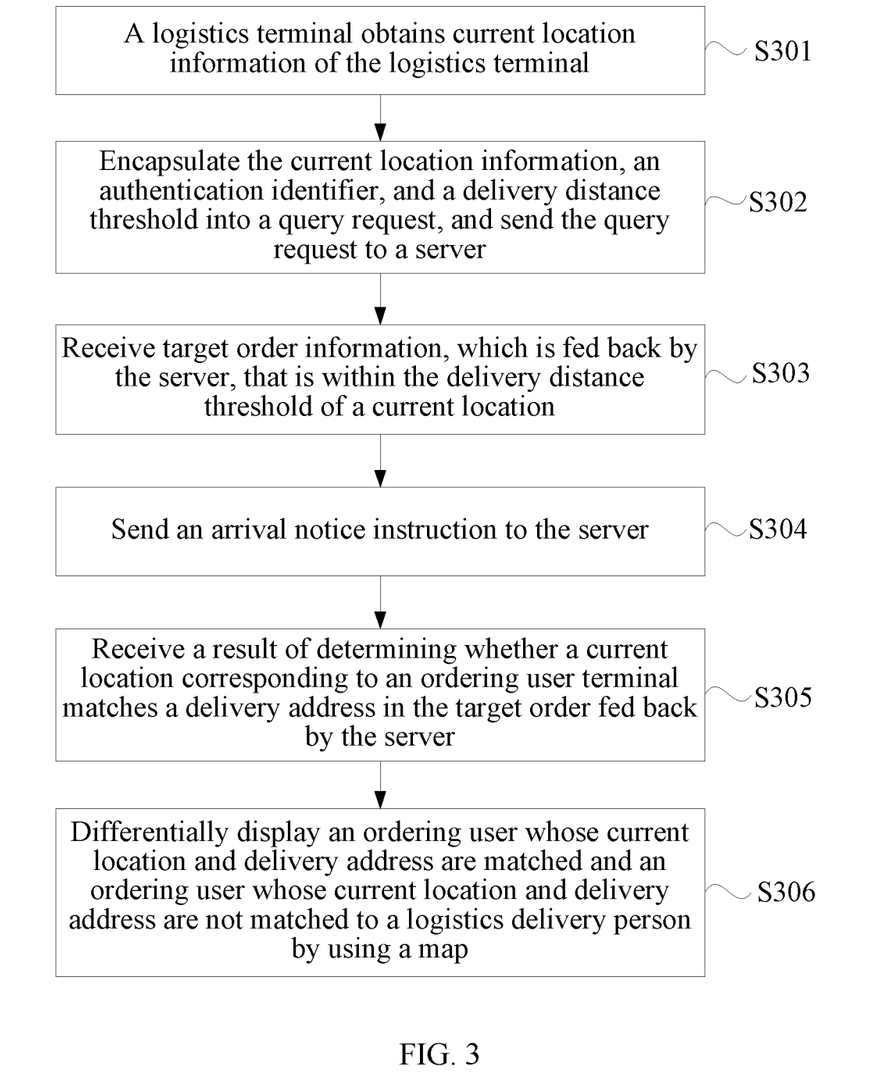
FIG. 3 is a third flowchart of an information processing method according to an embodiment of the present disclosure.

From the perspective of a logistics terminal, as shown in FIG. 3, an information processing method may include the following steps.

S301. The logistics terminal obtains current location information of the logistics terminal.

S302. Encapsulate the current location information, an authentication identifier, and a delivery distance threshold into a query request, and send the query request to a server.

S303. Receive information, which is fed back by the server, about a target order that is within the delivery distance threshold of a current location.

In this embodiment, step S301 to step S303 are similar to step S101 to step S103 in the foregoing embodiment, which are not repeatedly described herein.

S304. Send an arrival notice instruction to the server.

The arrival notice instruction is used to instruct the server to push online prompt information to a corresponding ordering user terminal according to the ordering user account in the target order, where the online prompt information includes the current location information of the logistics terminal, logistics delivery information, and a delivery address corresponding to the ordering user account; and the logistics delivery information may include a name of goods purchased by the ordering user, and a current logistics status, for example, information indicating that goods are already delivered to the current location of the logistics terminal.

The online prompt information sent by the server to the ordering user terminal includes the delivery address corresponding to the ordering user account, and therefore, after receiving the online prompt information pushed by the server, the ordering user terminal obtains a current location corresponding to the ordering user terminal, determines whether the current location matches the corresponding delivery address, and then feeds back a result of the determining to the server, so that the server feeds back the received result of the determining to the logistics terminal.

S305. Receive the result of the determining whether the current location corresponding to the ordering user terminal matches the delivery address in the target order fed back by the server.

S306. Differentially display an ordering user whose current location and delivery address are matched and an ordering user whose current location and delivery address are not matched to a logistics delivery person by using a map.

After the result of the determining whether the current location corresponding to the ordering user terminal matches the delivery address in the target order fed back by the server is received, an ordering user whose current location and delivery address are matched and an ordering user whose current location and delivery address are not matched may be differentially displayed to the logistics delivery person by using a map, so that the logistics delivery person directly knows whether the ordering user is within a range of a current delivery area, and separately notifies an ordering user that is not within the range of the current delivery area by using a Short Message Service (SMS) message or by phone, so that goods are delivered, or the ordering user picks up goods by himself or herself.

Figure 4:
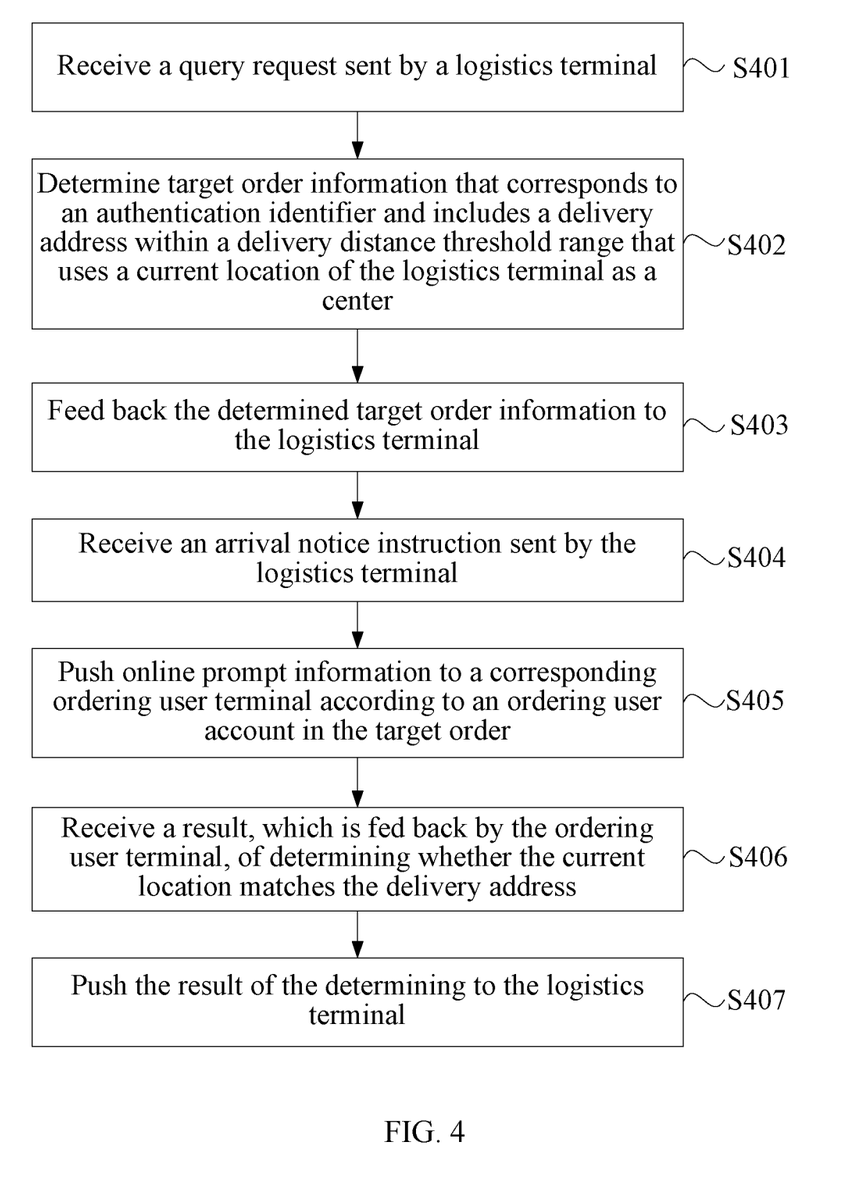
FIG. 4 is a fourth flowchart of an information processing method according to an embodiment of the present disclosure.

From the perspective of a server, as shown in FIG. 4, an information processing method may include the following steps.

S401. Receive a query request sent by a logistics terminal.

S402. Determine, in at least one prestored order, target order information that corresponds to the authentication identifier and includes a delivery address within a delivery distance threshold range that uses a current location of the logistics terminal as a center.

S403. Feed back the determined target order information to the logistics terminal.

In this embodiment, step S401 to step S403 are similar to step S201 to step S203 in the foregoing embodiment, which are not repeatedly described herein.

S404. Receive an arrival notice instruction sent by the logistics terminal.

S405. Push online prompt information to a corresponding ordering user terminal according to an ordering user account in the target order.

The online prompt information includes a delivery address corresponding to the ordering user account, current location information of the logistics terminal, and logistics delivery information.

After receiving the target order fed back by the server, the logistics terminal may send the arrival notice instruction to the server, so as to instruct the server to push the delivery address corresponding to the ordering user account, the current location information of the logistics terminal, and the logistics delivery information to the corresponding ordering user terminal by using the ordering user account in the target order. The server may push the online prompt information to the ordering user terminal in a form of a text message according to the ordering user account in the target order, and certainly, the form is not limited to the form of the text message.

Correspondingly, after the ordering user terminal receives the online prompt information pushed by the server, an ordering user may know a status of ordered goods in time; in addition, the online prompt information includes a delivery address corresponding to the ordering user terminal; in this case, the ordering user terminal needs to obtain a current location corresponding to the ordering user terminal, and determines whether the current location matches the corresponding delivery address, and then, feeds back a result of the determining to the server. The ordering user terminal may obtain the current location corresponding to the ordering user terminal by using a built-in GPS module, a base station positioning apparatus, or the like.

Whether the current location of the ordering user terminal matches the delivery address may be that the current location of the ordering user terminal is the same as the delivery address, or the current location of the ordering user terminal is within a specific range that uses the delivery address as a center, which are both proper.

S406. Receive the result of the determining whether the current location matches the delivery address, where the result of the determining is fed back by the ordering user terminal.

S407. Push the result of the determining to the logistics terminal.

After the result of the determining, which is fed back by the ordering user terminal, whether the current location matches the delivery address is received, the result of the determining may be pushed to the logistics terminal, so that the logistics terminal may differentially display an ordering user whose current location and delivery address are matched and an ordering user whose current location and delivery address are not matched to a logistics delivery person by using a map, so that the logistics delivery person directly knows whether the ordering user is within a range of a current delivery area, and separately notifies an ordering user that is not within the range of the current delivery area by using an SMS message or by phone, so that goods are delivered, or the ordering user picks up goods by himself or herself.

Further, after the online prompt information is sent to the ordering user terminal by using the ordering user account, an ordering user account in an offline state may be detected, that is: a client of an e-commerce system that is not logged in by using the ordering user account. Further, it is determined whether an SMS message prompt function is enabled for the offline ordering user account. For an offline ordering user account with the SMS message prompt function enabled, after the online prompt information is sent thereto, an SMS message may be further sent, by using a communication identifier included in the target order, to an ordering user terminal corresponding to the communication identifier, so as to prompt a corresponding ordering user to log in the client by using the ordering user account, and further process the online prompt information by using the corresponding ordering user terminal, and feed back the result of the determining whether the current location of the ordering user terminal matches the delivery address.

It can be understood that, the ordering user account may be offline and/or not have the SMS message prompt function enabled; as a result, the ordering user terminal cannot feed back, in time, the result of the determining whether the current location of the ordering user terminal matches the delivery address. To improve query experience of the logistics delivery person, the server may send a result of the determining that is received within a preset period of time to the logistics terminal, and neglect a result of the determining that is not received within the preset period of time. In this case, for an ordering user without a corresponding result of the determining, the logistics delivery person may consider by default that the ordering user is not within the range of the current delivery area, and notify the ordering user separately.

In this embodiment, after sending online prompt information to an ordering user terminal, a server not only can prompt a user to know a status of ordered goods in time and to pick up the goods in time, but also can instruct the ordering user terminal to determine whether a current location of the ordering user terminal matches a delivery address and to feed back a result of the determining to the server. After receiving the result of the determining fed back by the ordering user terminal, the server sends the result of the determining to a logistics terminal, so that a logistics delivery person knows whether an ordering user is within a range of a current delivery area, and separately notifies a user account that is not within the range of the current delivery area, thereby ensuring goods delivery efficiency and reducing a delivery cost.

Based on the foregoing descriptions of the method embodiments, a person skilled in the art may clearly understand that the present disclosure may be implemented by software in addition to a necessary universal hardware platform or by hardware only. In most circumstances, the former is a preferred implementation manner. Based on such an understanding, the technical solutions of the present disclosure essentially, or the part contributing to the other approaches may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a read-only memory (ROM), a random access memory (RAM), a magnetic disk, or an optical disc.

Figure 5:
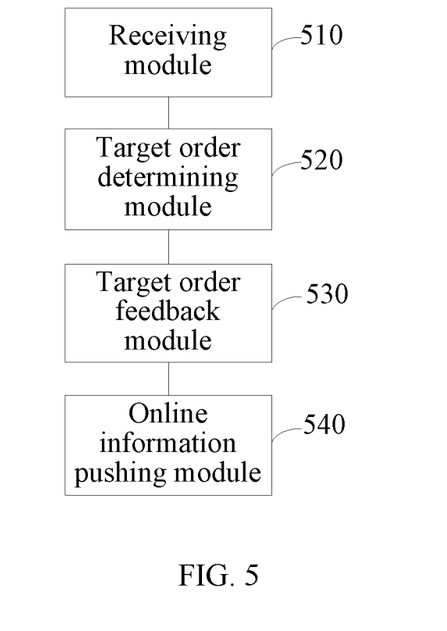
FIG. 5 is a schematic structural diagram of a server according to an embodiment of the present disclosure.

Corresponding to the foregoing method embodiments, an embodiment of the present disclosure further provides a server; as shown in FIG. 5, the server may include a receiving module 510 configured to receive a query request sent by a logistics terminal, where the query request carries current location information, a delivery distance threshold, and an authentication identifier that correspond to the logistics terminal; a target order determining module 520 configured to determine, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; a target order feedback module 530 configured to feed back the determined target order information to the logistics terminal; and an online information pushing module 540 configured to push online prompt information to a corresponding ordering user terminal according to the ordering user account in the target order after an arrival notice instruction sent by the logistics terminal is received, where the online prompt information includes the current location information of the logistics terminal and logistics delivery information.

During goods delivery, after receiving a query request sent by a logistics terminal and determining at least one target order that meets the query request, the server provided in the embodiment of the present disclosure feeds back target order information to the logistics terminal; and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

Further, the online information pushing module includes a text pushing unit configured to push the online prompt information to the ordering user terminal in a form of a text message according to the ordering user account in the target order.

Further, the online prompt information pushed by the online information pushing module further includes a delivery address corresponding to the ordering user account.

The server further includes a determining result processing module configured to receive a result of determining whether the current location matches the delivery address, where the result of the determining is fed back by the ordering user terminal; and push the result of the determining to the logistics terminal.

Figure 6:
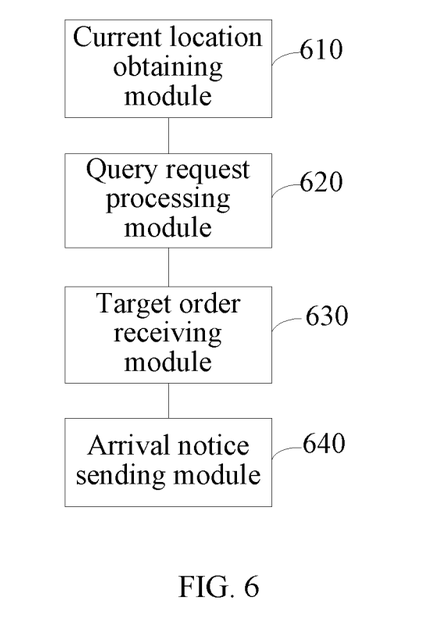
FIG. 6 is a schematic structural diagram of a logistics terminal according to an embodiment of the present disclosure.

An embodiment of the present disclosure further provides a logistics terminal; as shown in FIG. 6, the logistics terminal may include a current location obtaining module 610 configured to obtain current location information of the logistics terminal; a query request processing module 620 configured to encapsulate the current location information, an authentication identifier, and a delivery distance threshold into a query request, and send the query request to a server; a target order receiving module 630 configured to receive target order information that is within a delivery distance threshold of a current location, where the target order information is fed back by the server and includes an ordering user account and a delivery address; and an arrival notice sending module 640 configured to send an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

During goods delivery, the logistics terminal provided in the embodiment of the present disclosure encapsulates the current location information, an authentication identifier, and a delivery distance threshold into a query request, and sends the query request to a server; and after receiving information, which is fed back by the server, about a target order that is within a delivery distance threshold of a current location, the logistics terminal sends an arrival notice instruction to the server to instruct the server to push, according to an ordering user account in the target order, online prompt information that includes the current location information of the logistics terminal and logistics delivery information to a corresponding ordering user terminal, so as to simultaneously instruct multiple ordering users to pick up goods at a current location of the logistics terminal, thereby achieving objectives of improving goods delivery efficiency and reducing a delivery cost.

Further, the logistics terminal may further include a first presenting module configured to display, according to the order information, a delivery address corresponding to an ordering user and a current location corresponding to the logistics terminal to a logistics delivery person by using a map.

Further, the logistics terminal may further include a determining result receiving module configured to receive a result of determining whether a current location corresponding to the ordering user terminal matches the delivery address in the target order fed back by the server; and a second presenting module configured to differentially display an ordering user whose current location and delivery address are matched and an ordering user whose current location and delivery address are not matched to the logistics delivery person by using a map.

For the apparatus or system embodiments, since they are basically corresponding to the method embodiments, for relevant parts, reference may be made to the parts of the description of the method embodiments. The apparatus or system embodiment described above is merely exemplary, where the units described as separate parts may or may not be physically separate, and parts displayed as units may or may not be physical units, may be located in one position, or may be distributed on a plurality of network units. A part or all of the modules may be selected according to an actual need to achieve the objectives of the solutions of the embodiments. A person of ordinary skill in the art may understand and implement the embodiments without creative efforts.

In the several embodiments provided in the present disclosure, it should be understood that the disclosed system, apparatus, and method may be implemented in other manners without going beyond the spirit and scope of the present application. The present embodiments are merely exemplary, but are not intended to limit the protection scope of the present application. For example, the unit or subunit division is merely logical function division and may be other division in actual implementation. For example, a plurality of units or subunits may be combined. In addition, a plurality of units or components may be combined or integrated into another system, or some features may be ignored or not performed.

Furthermore, the described system, apparatus, method, and schematic diagrams of various embodiments, may be combined or integrated with another system, module, technology, or method. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementation manners of the present disclosure. It should be noted that a person of ordinary skill in the art may make certain improvements or polishing without departing from the principle of the present disclosure and the improvements or polishing should fall within the protection scope of the present disclosure.

The invention claimed is:

1. A method, comprising:
   logging into an e-commerce system using a logistics terminal associated with a logistics user account;
   obtaining a current location of the logistics terminal based on information from a base station or a Global Positioning System (GPS) through a communication channel;
   obtaining a delivery distance threshold range, wherein the delivery distance threshold range indicates a maximum preset distance between the current location of the logistics terminal and a delivery address of a target order;
   sending a query request to a server associated with the e-commerce system, wherein the query request comprises the current location and the delivery distance threshold range;
   receiving, in response to the query request, target order information from the server, wherein the target order information comprises an indication of an ordering user account associated with the e-commerce system, the delivery address of the target order, and goods information, and wherein the delivery address of the target order is within the delivery distance threshold range of the current location;
   displaying, in response to the delivery address of the target order being within the delivery distance threshold range of the current location of the logistics terminal, a map on the logistics terminal, wherein the map comprises the delivery address and the current location of the logistics terminal;
   sending a first notice instruction to the server, wherein the first notice instruction instructs the server to send prompt information according to a communication identifier associated with the target order to the ordering user account, and wherein the prompt information comprises a current delivery status of the target order;

sending, from the logistics terminal associated with the logistics user account to the server, an arrival notice instruction, wherein the arrival notice instruction is configured to instruct the server to push arrival information from the server to a terminal associated with the ordering user account;

detecting whether the ordering user account is in an offline state; and sending a short messaging service (SMS) message to a user associated with the ordering user account when the ordering user account is in the offline state.

2. The method of claim 1, wherein the target order information comprises the communication identifier.

3. The method of claim 1, wherein the prompt information further comprises the current location.

4. The method of claim 1, wherein the current location is based on a GPS signal.

5. The method of claim 1, wherein the current location is based on a base station signal.

6. The method of claim 1, wherein the delivery distance threshold range comprises 500 meters.

7. The method of claim 1, further comprising:
receiving a unique authentication identifier from the server; and
encapsulating the unique authentication identifier and the delivery distance threshold range to obtain the query request.

8. The method of claim 1, further comprising simultaneously notifying, after arriving at the delivery address, multiple ordering users by instructing the server to send push notifications to the multiple ordering users.

9. The method of claim 1, wherein the arrival notice instruction is further configured to push online prompt information to the ordering user account.

10. The method of claim 1, wherein the arrival information comprises a text message.

11. An apparatus, comprising:
one or more processors; and
a memory coupled to the one or more processors and configured to store programming instructions, wherein the programming instructions, when executed by the one or more processors, cause the apparatus to:
log into an e-commerce system, wherein the apparatus is associated with a logistics user account;
obtain a current location of the apparatus based on information from a base station or a Global Positioning System (GPS) through a communication channel; obtain a delivery distance threshold range, wherein the delivery distance threshold range indicates a maximum preset distance between the current location of the apparatus and a delivery address of a target order;
send a query request to a server associated with the e-commerce system, wherein the query request comprises the current location and the delivery distance threshold range;
receive, in response to the query request, target order information from the server, wherein the target order information comprises an indication of an ordering user account associated with the e-commerce system, the delivery address of the target order, and goods information, and wherein the delivery address of the target order is within the delivery distance threshold range of the current location;
display, in response to the delivery address of the target order being within the delivery distance threshold range of the current location of the apparatus, a map, wherein the map comprises the delivery address and the current location of the apparatus;
send a first notice instruction to the server, wherein the first notice instruction instructs the server to send prompt information according to a communication identifier associated with the target order to the ordering user account, and wherein the prompt information comprises a current delivery status of the target order;
send, from the apparatus associated with the logistics user account to the server, an arrival notice instruction, wherein the arrival notice instruction is configured to instruct the server to push arrival information from the server to a terminal associated with the ordering user account;
detect whether the ordering user account is in an offline state; and
send a short messaging service (SMS) message to a user associated with the ordering user account when the ordering user account is in the offline state.

12. The apparatus of claim 11, wherein the target order information comprises the communication identifier.

13. The apparatus of claim 11, wherein the prompt information further comprises the current location.

14. The apparatus of claim 11, wherein the one or more processors are further configured to execute the programming instructions to simultaneously notify, after arriving at the delivery address, multiple ordering users by instructing the server to send push notifications to the multiple ordering users.

15. A computer program product comprising computer-executable instructions for storage on a non-transitory computer-readable medium and that, when executed by one or more processors, cause an apparatus to:
log into an e-commerce system, wherein the apparatus is associated with a logistics user account;
obtain a current location of the apparatus based on information from a base station or a Global Positioning System (GPS) through a communication channel;
obtain a delivery distance threshold range, wherein the delivery distance threshold range indicates a maximum preset distance between the current location of the apparatus and a delivery address of a target order;
send a query request to a server associated with the e-commerce system, wherein the query request comprises the current location and the delivery distance threshold range;
receive, in response to the query request, target order information from the server, wherein the target order information comprises an indication of an ordering user account associated with the e-commerce system, the delivery address of the target order, and goods information, and wherein the delivery address of the target order is within the delivery distance threshold range of the current location;
display, in response to the delivery address of the target order being within the delivery distance threshold range of the current location of the apparatus, a map, wherein the map comprises the delivery address and the current location of the apparatus;
send a first notice instruction to the server, wherein the first notice instruction instructs the server to send prompt information according to a communication identifier associated with the target order to the ordering user account, and wherein the prompt information comprises a current status of the target order;

send, from the apparatus associated with the logistics user account to the server, an arrival notice instruction, wherein the arrival notice instruction is configured to instruct the server to push arrival information from the server to a terminal associated with the ordering user account;

detect whether the ordering user account is in an offline state; and send a short messaging service (SMS) message to a user associated with the ordering user account when the ordering user account is in the offline state.

16. The computer program product of claim 15, wherein the target order information further comprises the communication identifier.

17. The computer program product of claim 15, wherein the prompt information further comprises the current location.

18. The computer program product of claim 15, wherein the one or more processors are further configured to execute the computer-executable instructions to simultaneously notify, after arriving at the delivery address, multiple ordering users by instructing the server to send push notifications to the multiple ordering users.

* * * * *